2,940,073

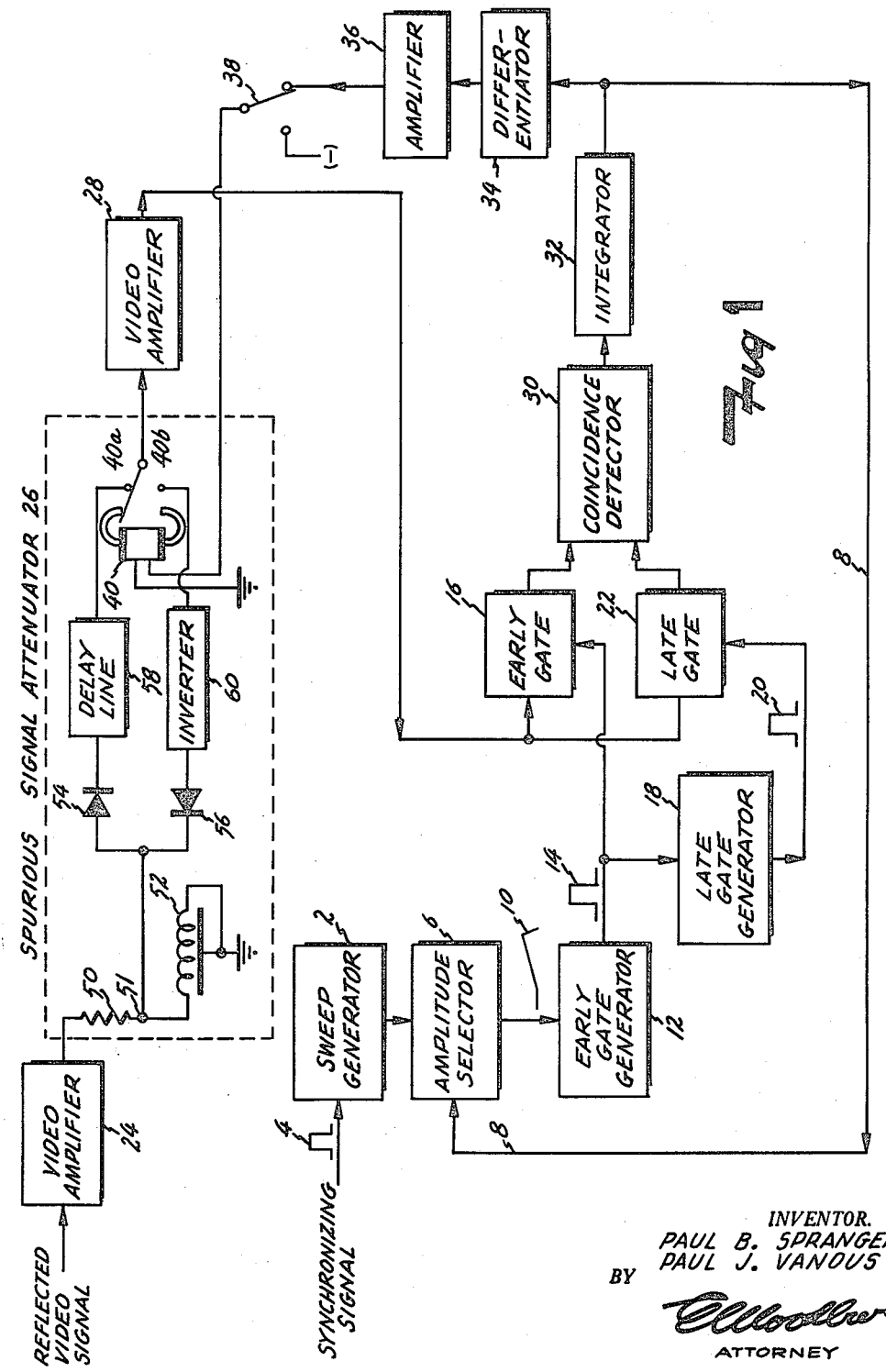

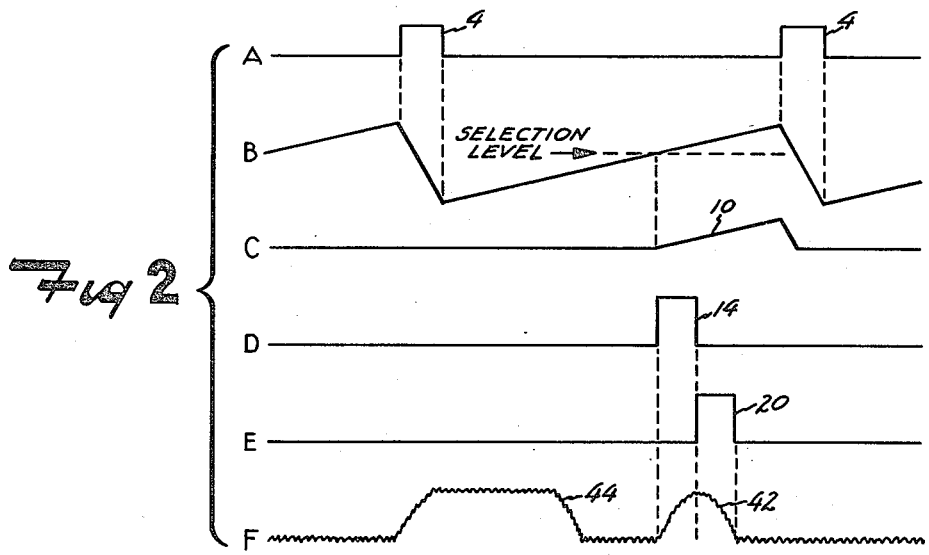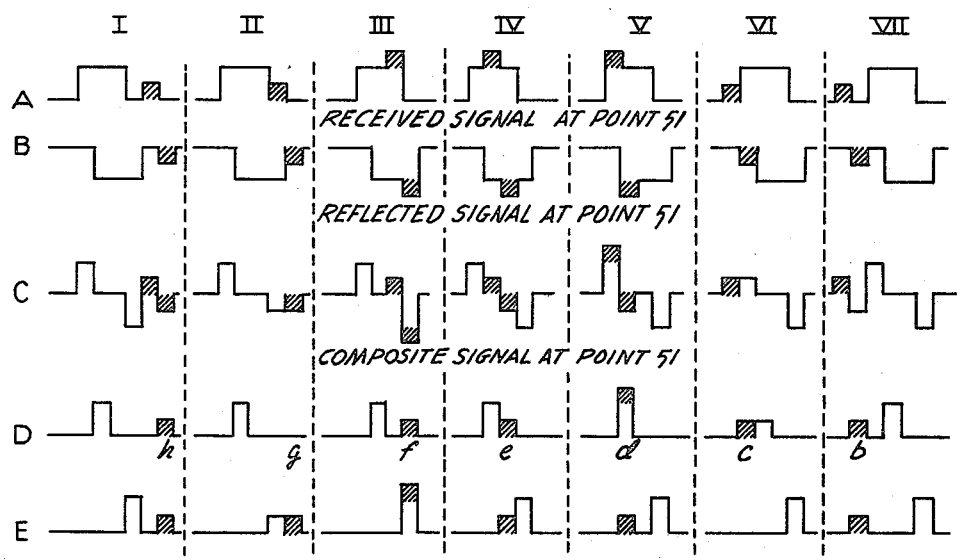

PULSE ECHO TRACKING SYSTEM

Paul B. Spranger, Sherman Oaks, and Paul J. Vanous, Reseda, Calif., assignors to Bendix Aviation Corporation, North Hollywood, Calif., a corporation of Delaware Filed May 17, 1956, Ser. No. 585,423

15 Claims. (Cl. 343—7.3)

This invention relates to pulse echo systems for tracking a moving target.

Present pulse radar systems operate by transmitting pulses of high freequency radio energy, and receiving back echo pulses reflected from a target. The time lapse between transmission and reception is then sensed to indicate the distance to the target.

While tracking a moving target by radar, pulses may be reflected from objects other than the target to form spurious echo signals or pulses which may interfere with tracking. When a spurious signal occurs during the same time interval as a pulse reflected from the target being tracked, the radar system may lock upon the object creating the large spurious signal, and the target will be lost.

Briefly, the present invention is a system for attenuating spurious pulses occurring in a reflected video signal, while preserving desired reflected target pulses. The reflected video signal, upon being received, is delayed. The delayed video signal is then subtractively combined with the reflected video signal to form a combined video signal in which portions of spurious impulses will be attenuated by subtractive cancellation. The combined video signal is then rectified to form a refined video signal in which spurious pulse amplitudes have been attenuated while target pulse amplitude is preserved.

An object of the present invention is to provide an improved pulse echo tracking system.

Another object is to provide a radar system having improved immunity to spurious pulses.

Another object is to provide a selective circuit for attenuating signals having a time duration above a predetermined value, while passing signals unattenuated which have a time duration under the predetermined value.

Other and incidental objects and features of the invention will appear from the folowing description with reference to the drawings.

Fig. 1 is a block and schematic diagram of a portion of a radar receiving system incorporating the invention.

Fig. 2 shows various waveforms illustrating the operation of the system of Fig. 1.

Fig. 3 shows other waveforms illustrating the operation of the invention.

The system of Fig. 1 includes a sweep generator 2 connected to receive a radar synchronizing signal in the form of a pulse 4. The sweep generator 2 functions to generate a voltage which increases in substantially a linear fashion after the synchronizing signal 4 is received. The synchronizing signal 4 is also shown in Fig. 2A and is time related to the transmission of a pulse from the radar system, the reflection of which will indicate the target.

The output from the sweep generator 2, the waveform of which is shown in Fig. 2B, is applied to an amplitude selector 6 which also receives a voltage via a line 8. The amplitude selector 6 functions to pass that portion of the sweep signal from the sweep generator 2 which lies beyond the value of the selection voltage appearing on the line 8. Amplitude selectors of this type are well-known, and are shown and described beginning on page 325 of volume 19 of the Radiation Laboratories Series entitled, "Waveforms," published by McGraw-Hill Book Company.

A sawtooth pulse 10 will thus issue from the amplitude selector 6 time displaced from the synchronizing signal 4 an amount proportional to the magnitude of the selection voltage on the line 8. The pulse 10 is also shown in Fig. 2C, in time relationship to other signals. The sawtooth pulse 10 is applied to an early gate generator 12 which comprises a differentiating circuit serving to form an early gate pulse 14 upon receipt of the beginning of the sawtooth pulse 10. The gate pulse 14, as shown in Fig. 2D, is applied to an early gate 16 and to a late gate generator 18. The late gate generator 18 essentially comprises a delay circuit which serves to delay the early gate pulse 14 by a period equal to the time duration of the pulse 14, thereby forming a late gate pulse 20 as shown in Fig. 2E. The late gate pulse 20 is applied to a late gate 22. The early gate 16 and the late gate 22 are thus each opened for brief sequential intervals of time occurring after the synchronizing signal 4. These gates are utilized to pass a selected portion of the reflected video signal in which a major portion of the target pulse will be contained.

A system which operates in a mode broadly similar to the system of Fig. 1 is shown and described on page 342 of Volume 20 of the Radiation Laboratories Series entitled, "Electronic Time Measurements," published by McGraw-Hill Book Company.

The time interval between the occurrence of the synchronizing signal 4 and the pulse 14 serving to open the early gate 16 is controlled by the magnitude of the selection voltage applied to the amplitude selector 6, via the line 8. Since the synchronizing signal 4 is time related to the transmitted pulse, a desired target pulse, i.e., pulse reflected from a desired target, may be selected by varying the selection voltage applied to the amplitude selector 6, via the line 8, to open the gates 16 and 22 at a time to pass at least a part of the desired target pulse.

The reflected video signal shown in Fig. 2F is applied to a video amplifier 24, the output of which is connected to a spurious signal attenuator 26, the operation of which will later be described in detail, which is in turn connected to a video amplifier 28. The output of the video amplifier 28 is fed to the early gate 16 and the late gate 22. That portion of the video signal which coincides in time with the gate pulse 14 is passed by the early gate circuit 16, whereas the portion of the video signal which coincides with the late gate pulse 20 is passed by the late gate circuit 22. The signals passed by the early gate 16 and the late gate 22 are both applied to a coincidence detector circuit 30, which is in turn connected to an integrator circuit 32. The integrator circuit 32 is connected to the line 8, and to a differentiator circuit 34. The differentiator circuit 34 is connected through an amplifier circuit 36 and a switch 38 to a polar relay 40 within the spurious signal attenuator 26.

As shown in Fig. 2F, the reflected video signal contains a reflected target pulse 42 and a spurious impulse 44. Consideration of Fig. 2 will indicate that the portion of the reflected video signal of Fig. 2F which lies under the early gating pulse 14 will be passed by the early gate 16, and the portion of the reflected video signal which lies under the late gate pulse 20 will be passed by the late gate circuit 22. These portions are so timed as to include the target pulse 42. In the event that the target pulse 42 is essentially equally divided by the boundary between the early gating pulse 14 and the late gating pulse 20, then equal signals are passed by the gate circuits 16 and 22, and an equilibrium condition will exist. If, however, one of the gate circuits 16 or 22 passes a larger portion of the target pulse 42 than the other gate circuit, then an unbalance will occur which will be detected by the coincidence detector 30 serving essentially to perform a subtraction of the signals passed by the gate circuits 16 and 22, and to form control signals which are used to vary the timing of the gate circuits 16 and 22.

If the gate 16 passes a larger portion of the target pulse than the gate circuit 22, then a more positive voltage will be formed by the coincidence detector 30. If, however, the late gate 22 passes a larger portion of the energy content of the target pulse 42 than the early gate circuit 16, then a more negative voltage will be generated by the coincidence detector 30.

The signals issuing from the coincidence detector 30 are integrated into a smooth direct voltage by the integrator circuit 32 and clamped to form the selection voltage to be applied back to the amplitude selector 6 via the line 8. In this manner, variations from the equilibrium state (when equal portions of the target impulse are carried by the gate circuits 16 and 22) vary the magnitude of the selection voltage applied to the amplitude selector 6 via the line 8. Variation in the selection voltage varies the time of the occurrence of the sawtooth pulse 10 with respect to the synchronizing signal 4, thereby in turn varying the timing of the open intervals of the gate circuits 16 and 22 in such a manner as to tend to return the system to its equilibrium state. In this manner, an initially-selected target will be tracked by the radar receiver through various movements toward or away from the radar set.

It is to be assumed that the spurious signal 44 in Fig. 2F is a reflection from an object that is stationary or does not have the same movement as the target so that the target pulse 42 may cross over the signal 44. At a time when the target pulse crosses over a spurious pulse in the reflected video signal, the spurious pulse will be tracked if its energy content is sufficiently greater than the target pulse.

The system so far described without the spurious signal attenuator 26, differentiator 34, and amplifier 36 is conventional and is described in the above referenced volume 20 of the Radiation Laboratories Series. As hitherto used, the output of the video amplifier 24 was connected directly to the gates 16 and 22. In such systems, the gating circuits function to lock on the desired target pulse and follow it as the target approaches or recedes. When the target motion is uniform, the gates remain in synchronism with the desired target pulse even if the latter is not received for an interval. Thus, referring to Fig. 2F, if the target is approaching at a uniform rate, the target pulse 42 will pass through and be temporarily lost in the stronger spurious pulse 44. Despite the temporary loss of the target signal, the gates will continue to advance and will be in synchronism with the target pulse when it emerges from the spurious pulse 44. However, a serious defect of the former system is that at the time of emergence of the target pulse 42 from the spurious pulse 44, the energy from the spurious signal passed by gate 20 (Fig. 2E) may be so much greater than the energy from the target signal passed by gate 14 (Fig. 2D) that the gates stop moving with the target signal and lock on the spurious signal so that the target signal is lost. The present invention involving the spurious signal attenuator 26 greatly reduces the possibility of the gates locking on a spurious signal as the desired target pulse emerges therefrom.

Consideration will now be made of the spurious signal attentuator 26, and the manner in which it functions to attenuate large spurious pulses to allow tracking through such signals. The video signal from the video amplifier 24, upon being applied to the spurious signal attenuator 26, passes through a resistor 50 to a delay line 52 which is connected to ground. The junction point 51 between the resistor 50 and the delay line 52 is connected to oppositely poled rectifier diodes 54 and 56. The diode 54 is connected through a delay line 58 to the stationary contacts 40a of the polar relay 40. The diode 56 is connected through an inverter circuit 60 to the stationary contacts 40b.

Video signals appearing at the point 51 pass through the delay line 52, and, by reason of the fact that the delay line is grounded, are reflected back through the delay line, and reappear at the point 51 inverted in form and delayed in time by an interval coinciding to twice the delay of the delay line 52. The effect of the resistor 50 and the delay line 52 is thus to delay the reflected video signal by a predetermined amount, and then to subtractively combine the delayed video signal with the received video signal to form a combined video signal.

Consider now Fig. 3 which illustrates the effect of the delay and subtraction, i.e., delay, inversion, and algebraic combination. Fig. 3 is divided into columns I, II, III, IV, V, VI, and VII. Each of the columns shown in Fig. 3A shows a shadowed representation of a target pulse placed on a common time base with a larger spurious signal pulse. The different columns show different time relationships between the spurious pulse and the target pulse. The pulses are idealized in form for illustrative purposes. Fig. 3B indicates the effect of a delaying and inverting the received signals shown in Fig. 3A as accomplished by the resistor 50 and the delay line 52 in the manner explained. Fig. 3C is the summation of the signals shown in Figs. 3A and 3B, and shows the signal which will appear at the point 51; i.e., the algebraically combined video signals and delayed video signals. Fig. 3D shows the signal appearing at the contacts 40a when the signal of Fig. 3C is passed through the rectifier 54 and the delay line 58. As shown in Fig. 3, the delay line 58 produces the same delay in the video signal as the delay line 52; Fig. 3E shows the signal appearing at the contact 40b when the signal of Fig. 3C is passed through the rectifier 56 and the inverter 60.

Consider now that the target is closing on the radar set, thereby causing the target pulse (the shaded area in Fig. 3A) to move ever closer to the transmitted pulse; i.e., to the left in Fig. 2F. The shaded target pulse will gradually move to the left through the unshaded spurious pulse. Figs. 3D and 3E show that as the desired target pulse passes from right to left through the spurious pulse, the spurious pulse at contacts 40a and 40b has been so altered as to never have a greater time duration than the desired target signal.

In Fig. 3A, the target pulse moves to the left from time "h" in column I to time "b" in column VII. At the time of emergence (column VI) of the target pulse from the spurious pulse, there would be a strong tendency, without the present invention, for the gates to lock onto the spurious pulse because the late gate would pass more energy from the spurious pulse than the early gate would pass from the target pulse. However, with the present invention, the pulses passing through and controlling the timing of the gates are those shown in Fig. 3D, in which it is to be noted that at no time does the remnant of the spurious pulse exceed the target pulse in width. Of more importance, when the target pulse leaves the spurious pulse (column VI), the latter is no larger than the target pulse so there is little tendency for the gates to lock onto the spurious pulse. In column IV there is a tendency for the gates to recognize the spurious pulse rather than the target pulse; however, this does not create a problem except at the time when the target pulse departs from the spurious pulse. That is, when the spurious pulse becomes separated from the target pulse as shown in columns II and VI, it is important that the target pulse be as large as the spurious pulse as shown in Figs. 3D and 3E.

It may therefore be seen that at the time when the tracked target range is closing, it will be desirable to use the signal passing through the delay line 58; i.e., the signal shown in Fig. 3D. If, however, the target range is opening, then the sequence of events, as shown by the columns I, II, and III of Fig. 3, will be reversed. That is, column VII will occur first and column I last, as the shadowed target signal crosses the spurious signal from left to right. Consideration of Fig. 3D will indicate that if this signal is used, the spurious signal as shown in column V will be larger in amplitude than the desired target pulse when the crossing is completed; therefore, this signal is unsatisfactory for an opening target. If, however, the sequence of events is from column VII to column I, then the target pulse in Fig. 3E will depart from the spurious signal (column II) at the same amplitude as the spurious signal. It is therefore desirable to utilize the signal shown in Fig. 3E, i.e., the signal passing through the inverter circuit 60, when the target range is opening. Movement of the target pulse into a spurious pulse of larger magnitude is not undesirable, as it will always be lost in a larger spurious pulse and the exact location won't be ascertained. The movement of the target pulse out of the spurious pulse is, however, critical in that the time of separation is the time when the system may lose the target pulse by locking on the spurious pulse.

Selection of the rectified signal to be utilized is effected by the polar relay 40. In the event that a closing target is observed, the voltage from the integrator 32 will be decreasing, to cause the timing interval between the transmitted pulse and the gating pulses to decrease. By reason of the fact that this signal is decreasing in magnitude, the differentiator circuit 34 will form a negative voltage. The negative voltage from the differentiator circuit 34 will be amplified by the amplifier circuit 36, and applied through the switch 38 to the polar relay 40, causing the movable contact of the polar relay to be raised, as shown. With the movable contact of the polar relay 40 raised, the video signal of Fig. 3D, passing through rectifier 54, will be utilized as the video signal.

When the target range is opening, the voltage from the integrator circuit 32 is increasing, and differentiation of such a voltage by the differentiator circuit 34 results in a positive voltage. The positive voltage from the differentiator circuit 34, when amplified by the amplifier circuit 36 and applied to the polar relay 40, causes the movable contact of the polar relay 40 to drop to the lower position. With the movable contact of the polar relay in the lower position, the video signal from the inverter circuit 60 will be passed to the video amplifier 28.

It may therefore be seen that during intervals when the target range is closing, the signals shown in Fig. 3D are utilized; and, when the target range is opening, the signals represented by Fig. 3E are utilized. The system may thus be seen to operate either upon closing or opening targets to maintain target lock-on by attenuating spurious impulses to such a degree that their widths do not exceed the desired target signal, and reducing the amplitude of spurious signals with respect to the desired target signals, such that as the two signals separate, the spurious signal will always be no greater than the target signal.

In certain tracking operations, targets will always be closing. During such operations, the circuitry provided for opening target conditions may be disabled by the switch 38. When the switch 38 is thrown to apply a negative voltage to the polarized relay 40, the movable contact of the relay 40 will be maintained in a raised position. The closing target mode of operation will thus be maintained. It is noteworthy that during this mode of operation, the delay line 58 and rectifier 54 are not used, and can be eliminated from systems utilized only to track closing targets.

Although for the purpose of explaining the invention, particular embodiments thereof have been shown and described, obvious modifications will occur to a person skilled in the art, and we do not desire to be limited to the exact details shown and described.

What is claimed is:

1. In a pulse echo target tracking system means for receiving a reflected video signal having spurious impulses and target impulses; means for delaying said reflected video signal to form a delayed video signal, means for subtractively combining said reflected signal and said delayed video signal to form a difference video signal having negative and positive signal fluctuations of said difference video signa; tracking means for detecting the mode of movement of a target; and means for passing certain of said signal fluctuations to said tracking means controlled by the mode of movement of said target.

2. In a pulse echo target-tracking system: means for receivng a reflected video signal; means for delaying said reflected video signal to form a delayed video signal; means for subtractively combining said reflected video signal and said delayed video signal to form a combined video signal; means for separating said combined video signal into a positive fluctuation signal and a negative fluctuation signal; tracking means for determining the mode of movement of a target being tracked by said system; and switching means for applying one of said fluctuation signals to said tracking means controlled by the mode of movement of said target being tracked.

3. In a pulse echo target-tracking system: means for receiving a reflected video signal; means for delaying said reflected video signal to form a delayed video signal; means for subtractively combining said reflected video signal and said delayed video signal to form a combined video signal, first rectifier means for passing one portion of said combined video signal lying above a reference level, second rectifier means for passing another portion of said combined video signal lying below said reference level, tracking means for sensing the mode of movement of a target being tracked by said system; and means for applying one of said portions of said video signal to said tracking means controlled by the mode of movement of said target.

4. In a pulse echo target-tracking system: means for receiving a reflected video signal; means for delaying said reflected video signal to form a delayed video signal; means for subtractively combining said reflected video signal and said delayed video signal to form a combined signal, means for separating said combined video signal into a positive fluctuation signal and a negative flucutation signal, phase adjustment means for placing said positive and said negative flucutation signals in a similar phase, tracking means for determining the mode of movement of a target being tracked; and switching means for applying one of said flucutation signals to said tracking means.

5. A system according to claim 4 wherein said means for delaying said reflected video signal and said means for substractively combining said reflected video signal and said delayed video signal comprises a delay line connected to reflect said reflected video signal in an inverted form.

6. A system according to claim 4 wherein said means for separating comprises first and second oppositely poled diodes connected to receive said combined video signal.

7. A system according to claim 4 wherein said phase adjustment means comprises a delay means acting upon one of said fluctuation signals.

8. In a range-tracking pulse echo distance-measuring system in which spaced signal pulses of fixed time duration are transmited, and pulses are received and desired echo pulses filtered from undesired pulses non-coincident therewith by a tracking gating device, apparatus for modifying received pulses prior to application to the gating device, to reduce interference by spurious pulses closely time-related to desired echo pulses, said apparatus comprising: means for deriving from received pulses first and second trains of corresponding unidirectional electric pulses, said second train delayed said fixed time with respect to said first train; means for subtractively combining said two trains of pulses to cancel coincident pulses therein and produce a third train of pulses containing pulses corresponding to uncanceled pulses of said first and second trains; and means for selecting from said third train a fourth train of pulses corresponding to uncanceled pulses of one only of said first and second trains, for application to said gating device.

9. Apparatus according to claim 8 in which said fourth train corresponds to said first train, and including means for delaying said fourth train of pulses said fixed time prior to application thereof to said gating device.

10. Apparatus according to claim 9 including means for selecting, from said third train, a fifth train of pulses corresponding to uncanceled pulses of said second train, for application to said gating device.

11. Apparatus according to claim 10 including means for inverting the polarity of said pulses of said fifth train prior to application thereof to said gating device.

12. Apparatus according to claim 8 in which said means for deriving and subtractively combining said first and second trains comprises: means for deriving said first train from said received pulses; a reflection circuit having a terminal to which said first train is applied and functioning to reflect back to said terminal delayed and polarity-inverted pulses of said first train combining with the latter at said terminal to produce said third train.

13. Apparatus according to claim 12 in which said means for selecting said fourth train comprises a rectifying circuit connected to said terminal and poled to pass only pulses of the polarity of said first train.

14. Apparatus according to claim 12 including a rectifying circuit connected to said terminal and poled to pass only a fifth train of pulses of opposite polarity to said first train.

15. Apparatus according to claim 14 including means for inverting the polarity of said fifth train of pulses.

References Cited in the file of this patent

UNITED STATES PATENTS 2,523,283   Dickson _____ Sept. 26, 1950